(12) United States Patent
Alis

(10) Patent No.: US 6,454,146 B2
(45) Date of Patent: Sep. 24, 2002

(54) CELL PHONE HOLDER

(76) Inventor: Joshua M. Alis, 189 Lakeview, Ringwood, NJ (US) 07456

( * ) Notice: Subject to any disclaimer, the term of this patent is extended or adjusted under 35 U.S.C. 154(b) by 0 days.

(21) Appl. No.: 09/770,348

(22) Filed: Jan. 26, 2001

Related U.S. Application Data

(60) Provisional application No. 60/184,336, filed on Feb. 23, 2000.

(51) Int. Cl.[7] .................................................. A45F 5/02
(52) U.S. Cl. ........................................ 224/250; D3/218
(58) Field of Search ............................... 224/676, 677, 224/250, 660, 680, 681; D3/218

(56) References Cited

U.S. PATENT DOCUMENTS

| 1,486,470 A | | 3/1924 | Welch |
| 1,781,816 A | | 11/1930 | Jovino |
| 2,317,820 A | * | 4/1943 | Smith .......................... 224/235 |
| 2,644,623 A | | 7/1953 | White |
| 3,361,312 A | * | 1/1968 | Hutchison .................... 224/677 |
| 3,956,701 A | | 5/1976 | James, Jr. |
| 3,977,516 A | | 8/1976 | Tilve |
| 4,485,946 A | | 12/1984 | Liautaud |
| 4,569,465 A | * | 2/1986 | O'Farrell ..................... 224/224 |
| 5,170,919 A | * | 12/1992 | DeSantis ..................... 224/229 |
| 5,244,023 A | * | 9/1993 | Spies .......................... 150/134 |
| D343,059 S | * | 1/1994 | Daniels et al. ................ D3/43 |
| D346,815 S | | 5/1994 | Wake |
| 5,511,704 A | | 4/1996 | Linderer |
| 5,620,120 A | | 4/1997 | Tien |
| D394,347 S | * | 5/1998 | Girvetz ........................ D3/215 |
| D395,545 S | * | 6/1998 | Crim, Jr. ...................... D3/218 |
| 5,833,100 A | | 11/1998 | Kim |
| D446,928 S | * | 8/2001 | Formica ....................... D3/218 |

* cited by examiner

Primary Examiner—Stephen P. Garbe
(74) Attorney, Agent, or Firm—Daniel V. Thompson

(57) ABSTRACT

An improved cell phone holder has a fixed, substantially horizontal, phone pocket with an open end, the phone pocket sized to firmly hold the phone at the waist of a user when not in use, yet quickly release the phone through the open end when needed.

18 Claims, 3 Drawing Sheets

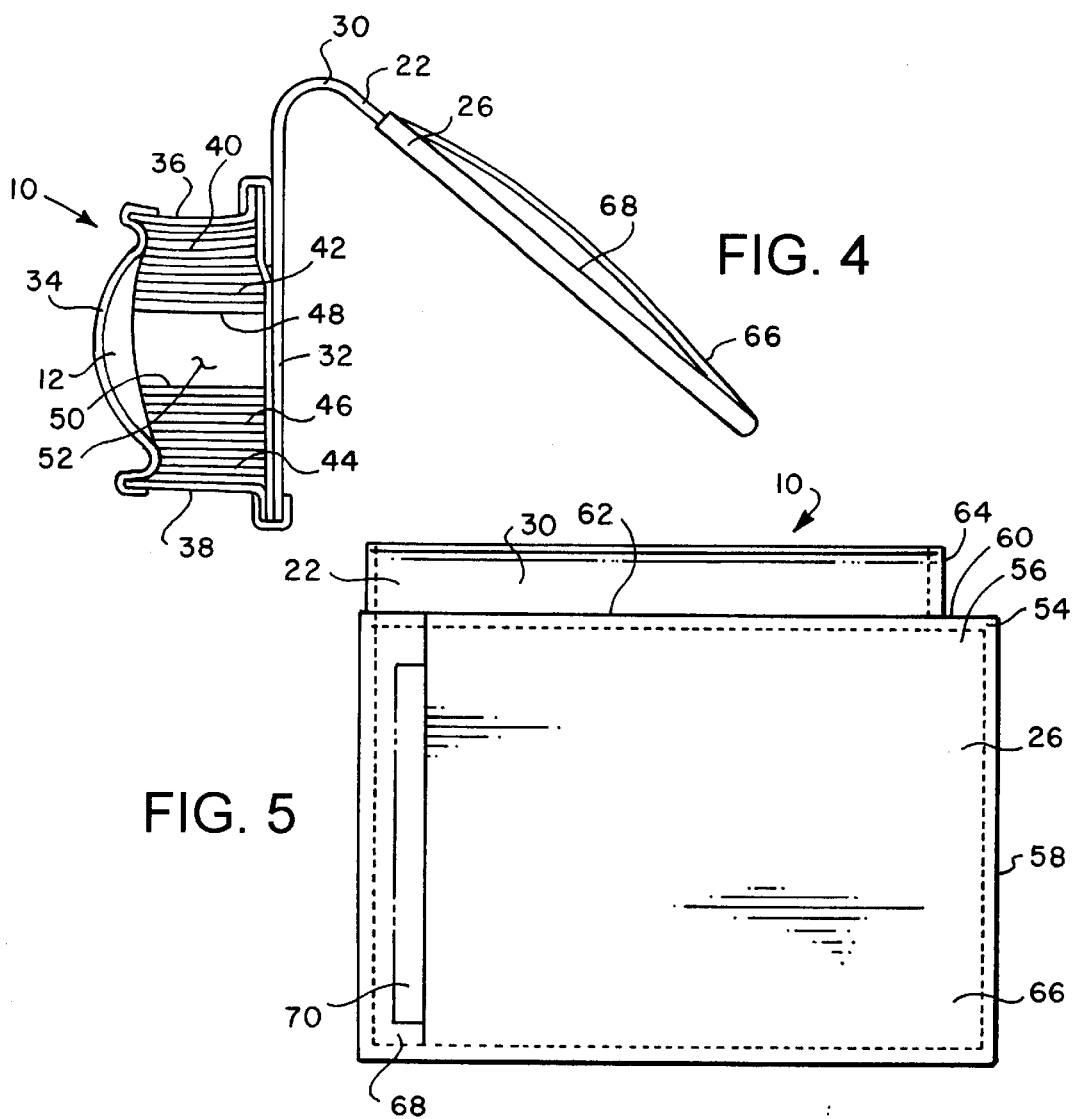
FIG. 4
FIG. 5
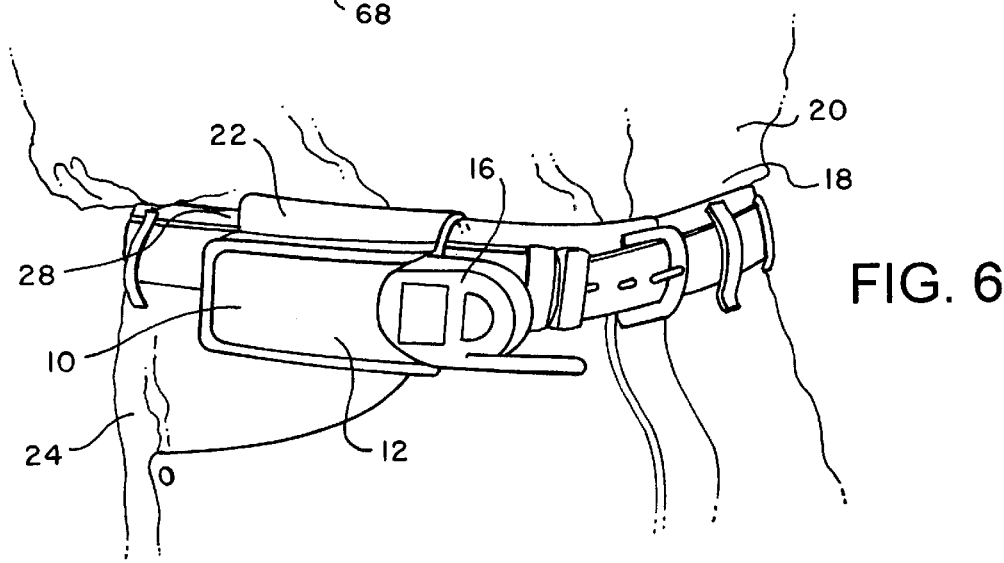
FIG. 6

CELL PHONE HOLDER

CROSS-REFERENCE TO RELATED APPLICATION.

Applicant claims the benefit under 35 USC §119(e) of Provisional Patent Application Ser. No. 60/184,336 filed Feb. 23, 2000.

TECHNICAL FIELD

This invention is related to personal articles, and more particularly to an improved cell phone holder.

BACKGROUND ART

Typical cell phone holders are configured to hold the cell phone vertical. This makes them uncomfortable and inconvenient to use. Moreover, typical cell phone holders are equipped with rigid clips or belt loops, which are also inconvenient and uncomforttable, and not readily adaptable th clothing with loose waists, no waist (skirts), or no belts.

U.S. Pat. No. 1,486,470; discloses a fisherman's belt with a combination of horizontal and verttical pockets.

U.S. Pat. No. 1,781,81 discloses a cartridge holder with a horizontal pocket.

U.S. Pat. No. 2,644,623 discloses a bottle holder with a horizontal pocket.

U.S. Pat. No. 5,511,704 discloses a belt holder for a cellular phone. A pocket is not utilized.

U.S. Pat. No. 5,833,100 discloses a pivotable phone pocket.

U.S. Pat. No. D346,815 discloses a sunglasses case with belt loop attachment.

U.S. Pat. No. 3,977,516 discloses an eyeglass receptacle with belt loop attachment.

U.S. Pat. No. 4,485,946 discloses a pivotable radio holder.

U.S. Pat. No. 3,956,701 discloses a pivotable pager holder.

U.S. Pat. No. 5,620,120 discloses a pivotable portable telephone holder.

SUMMARY OF THE DISCLOSURE

This invention provides an improved cell phone holder that holds the phone substantially horizontal. The holder includes a phone pocket made of supple leather, sized to firmly hold the phone when not in use, yet quickly release it when needed.

The key feature of the invention is the substantially horizontal positioning of the phone pocket at the waist of the user, which enables comfort in all sitting, standing and bending positions. Protection of the phone is provided by enabling a more frontal position for the phone than the hip side or buttocks side positions favored by users of vertical phone holders.

Another key feature is the securing structure, which includes a planar element inside the waist band of the user joined to the phone pocket by a flexible hinge. Preferably the entire assembly of pocket, hinge and planar element are made of leather, with different sections of the assembly made of specific types and thicknesses of leather best suited for the specific functions. The planar element may optionally be a business card holder, which conveniently holds business cards, and which enables ready adjustment of the thickness of the planar element to adapt its securing function to different garment and torso configurations.

BRIEF DESCRIPTION OF THE DRAWINGS

A more complete understanding of the invention and its advantages will be apparent from the Detailed Description taken in conjunction with the accompanying Drawings, in which:

FIG. 4 is a side view.

FIG. 5 is a back view.

FIG. 6 is a view of the holder in use.

DETAILED DESCRIPTION OF THE PREFERRED EMBODIMENT

Referring initially to FIGS. 1–6, where like numerals indicate like and corresponding elements, an improved cell phone holder 10 has a fixed, substantially horizontal, phone pocket 12. Phone pocket 12 is "fixed" in the sense that it is not rotatable, pivotable or otherwise movable from a horizontal orientation to a longitudinally vertical or inclined orientation as is common in the prior art. It may be desirable to provide for slight pivoting freedom with the longitudinal dimension of the phone and phone pocket remaining fixed horizontally, to provide comfort while sitting or bending.

Figures 1, 2, 3:
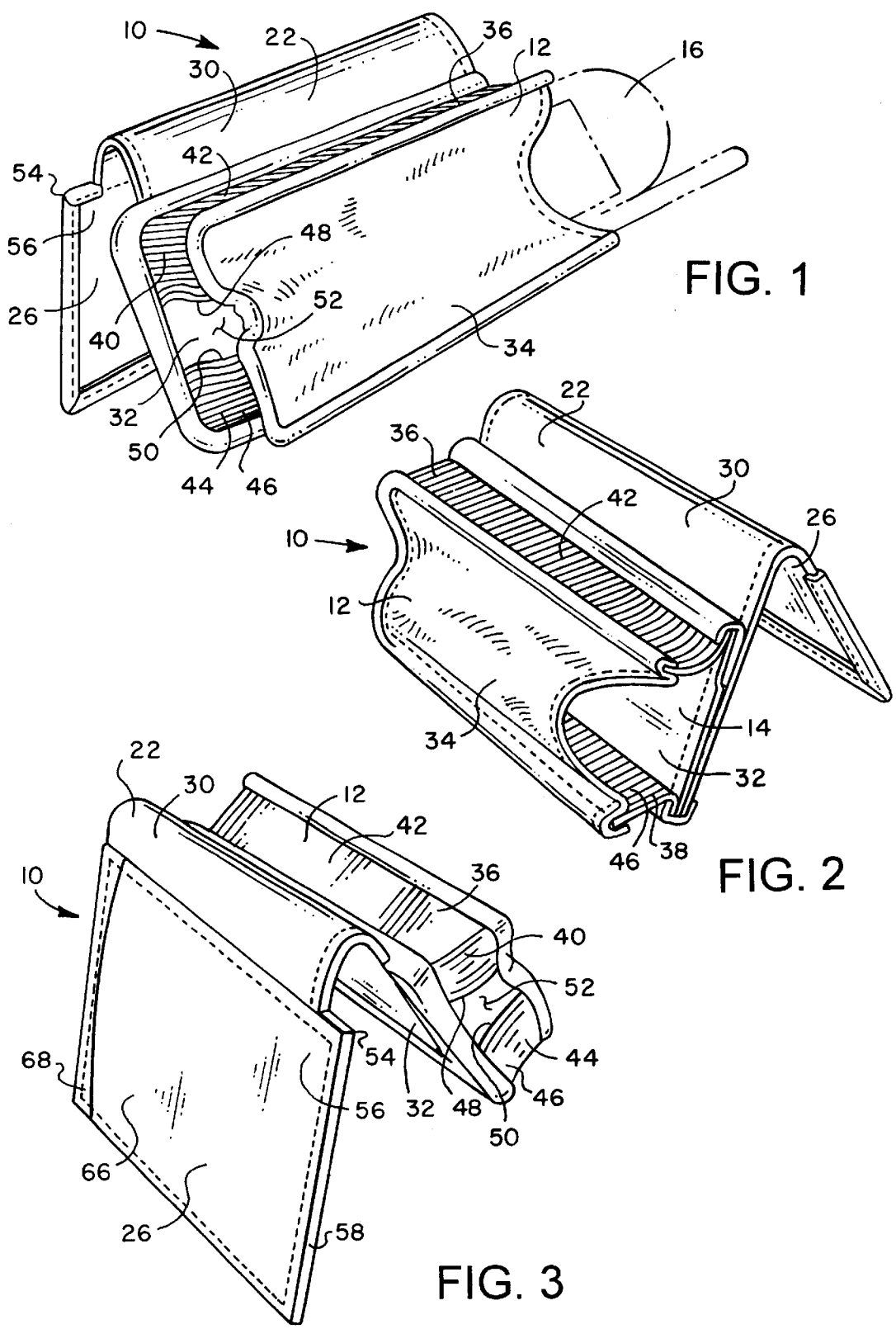
FIG. 1 is a left-front perspective view of the cell phone holder of the present invention.
FIG. 2 is a right-front perspective view.
FIG. 3 is a left-back perspective view.
Figure 7:
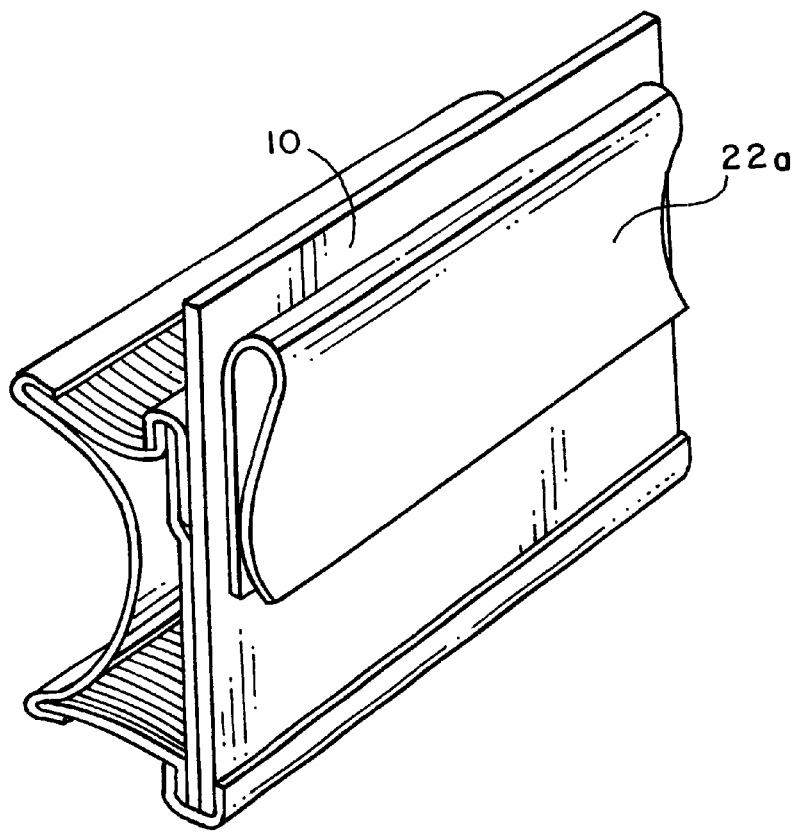
FIG. 7 is a left-back perspective view of a first alternate embodiment.
Figure 8:
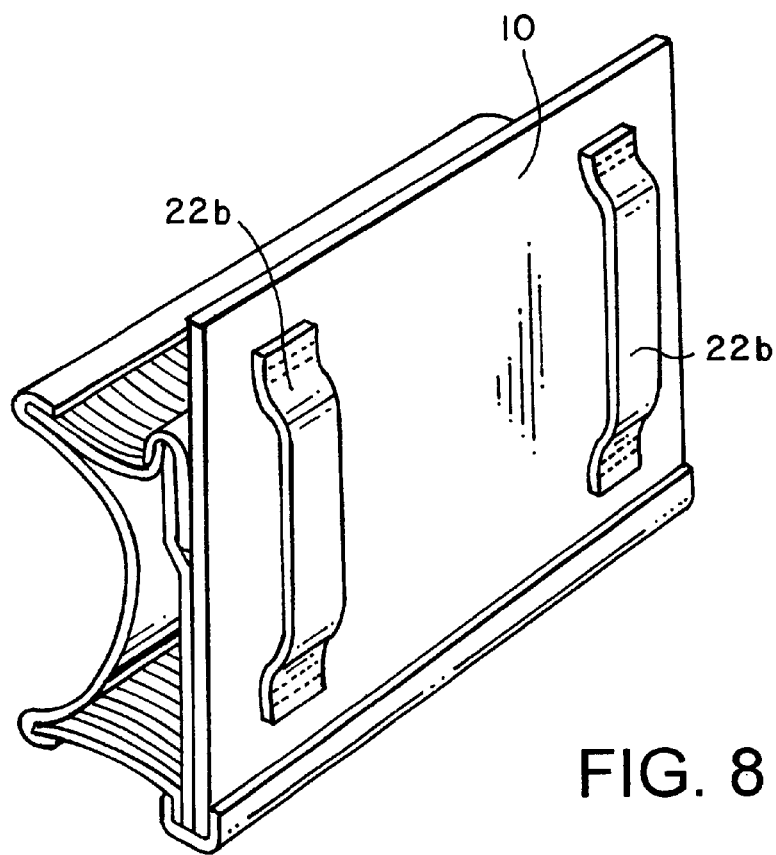
FIG. 8 is a left-back perspective view of a second alternate embodiment.

Phone pocket 12 has an open end 14, which is sized to firmly hold the phone 16 at the waist 18 of a user 20 when the phone 16 is not in use, yet quickly release the phone 16 through the open end 14 when needed. Securing structure 22 is provided for securing the holder 10 to the user's apparel 24 in the vicinity of the waist 18. In one embodiment of the invention, the securing structure 22 is a planar element 26 inside the apparel waist band 28 joined to the phone pocket by a flexible hinge 30. The flexible hinge 30 provides a slight pivoting freedom with the longitudinal dimension of the phone and phone pocket remaining fixed horizontally, as described above. In a first alternate embodiment of the invention, securing structure 22a (FIG. 7) is a clip, and in a second alternate embodiment securing structure 22b (FIG. 8) is at least one belt loop.

The phone pocket 12 has a stiff back 32, a flexible front 34, a flexible top 36 and a flexible bottom 38. The combination of stiff and flexible parts of the pocket are a key feature of the invention. The flexibility of the front, top and bottom permits deformation of those parts to accept and releasably hold the phone. Meanwhile, the stiff back adds sufficient stiffness to the structure to permit the phone to be inserted one-handed and prevent collapsing of the pocket as a phone is inserted under reasonable force. The flexible parts also permit utilization of a single-sized pocket with a wide variety of differently-sized phones, which enables an efficient "one size fits all" manufacturing and distribution process.

It has been found that a particular combination of materials is especially advantageous. The front 34 of the phone pocket 12 made of thin, supple, and flexible lamb leather, while the back 32 of the phone pocket 12, the hinge 30. and the planar element 26 are made of relatively thick and stiff water buffalo leather. The top 36 and an upper side 40 of the phone pocket 12 are a first, unitary, continuous piece 42 of elastic textile material, and the bottom 38 and a lower side 44 of the phone pocket 12 are a second, unitary, continuous piece 46 of elastic textile material.

The upper and lower sides 40, 44 are separated by edges 48, 50 defining an access port 52. Access port 52 allows the phone 16 to be pushed out partially from the end within the phone pocket 12 and retrieved from the open end 14, one-handed. In addition, battery charger and mike/earphone connections can be made through access port 52.

At least one stabilization corner 54 is provided in the vicinity of the junction 56 of the hinge 30 and planar element 26. As best shown in FIG. 5, the stabilization corner 54 is formed from a side 58 and portion 60 of a top 62 of the planar element 26 extending horizontally beyond the proximal side 64 of the hinge 30. The stabilization corner 54 serves to anchor and stabilize the planar element within the waist band of the user's apparel, by its stiffness catching the waist band to a slight degree as the waist band curves around the waist of the user.

A card pocket 66 on a back surface 68 of the planar element 26 may optionally be provided for holding business cards 70. The card pocket 66, while handy for storing cards, more importantly provides the subtle function of allowing the user to adjust the thickness of the planar element 26 for an optimal balance between comfort and stability of the holder.

While a right body carry device is illustrated and described, it will be understood that a device constructed mirror-image may be utilized for a left body carry.

It will be understood that each of the elements described above, or two or more together, may also find a useful application in other types of constructions differing from the type described above.

While the invention has been illustrated and described as embodied in a cell phone holder, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

Whereas, the present invention has been described with respect to a specific embodiment thereof, it will be understood that various changes and modifications will be suggested to one skilled in the art and it is intended to encompass such changes and modifications as fall within the scope of the appended claims.

I claim:

1. An improved cell phone holder, comprising:
a substantially horizontal, phone pocket with an open end;
with securing structure for securing the holder to the user's apparel in the vicinity of the waist; and
with the securing structure being a planar element inside an apparel waist band joined to the phone pocket by a flexible hinge.

2. The holder of claim 1 with a front and back of the phone pocket, the hinge and the planar element made of leather.

3. The holder of claim 2 with the front of the phone pocket made of lamb leather and the back of the phone pocket, the hinge and the planar element made of water buffalo leather.

4. The holder of claim 2 with a top and a bottom of the phone pocket made of elastic textile material.

5. The holder of claim 3 with a top and a bottom of the phone pocket made of elastic textile material.

6. The holder of claim 4 with an upper side and a lower side of the phone pocket made of elastic textile material.

7. The holder of claim 6 with the top and upper side of the phone pocket being a first, unitary, continuous piece of elastic textile material, and the bottom and lower side of the phone pocket being a second, unitary, continuous piece of elastic textile material.

8. The holder of claim 1 with at least one stabilization corner in the vicinity of a junction of the hinge and planar element.

9. The holder of claim 8 with the stabilization corner formed from a side and portion of a top of the planar element extending horizontally beyond a proximal side of the hinge.

10. The holder of claim 1 with a card pocket on a surface of the planar element for holding business cards.

11. The holder of claim 10 with the card pocket on a back surface of the planar element.

12. An improved cell phone holder, comprising:
a phone pocket fixed to securing structure such that the pocket is substantially horizontal when the securing structure is engaged with apparel of a user, the phone pocket having an open end, and a portion of the phone pocket being flexible to conform to the phone and to firmly hold the phone at the waist of a user when the phone is not in use, yet quickly release the phone through the open end when needed; and
with the phone pocket having a stiff back, a flexible front, a flexible top and a flexible bottom.

13. The holder of claim 12 with the top and bottom of the phone pocket being elastic.

14. The holder of claim 13 with a flexible, elastic phone pocket side.

15. The holder of claim 13 with flexible, elastic, upper and lower sides separated by edges defining an access port.

16. An improved cell phone holder, comprising:
a phone pocket fixed to securing structure such that the pocket is substantially horizontal when the securing structure is engaged with apparel of a user, the phone pocket having an open end, and a portion of the phone being flexible to conform to the phone and to firmly hold the phone at the waist of a user when the phone is not in use, yet quickly release the phone through the open end when needed;
with securing structure for securing the holder to the user's apparel in the vicinity of the waist; and
with the securing structure being a clip attached to back of the phone pocket.

17. An improved cell phone holder, comprising:
a phone pocket fixed to securing structure such that the pocket is substantially horizontal when the securing structure is engaged with apparel of a user, the phone pocket having an open end, and a portion of the phone pocket being flexible to conform to the phone and to firmly hold the phone at the waist of a user when the phone is not in use, yet quickly release the phone through the open end when needed;
with securing structure for securing the holder to the user's apparel in the vicinity of the waist; and
with the securing structure being at least one belt loop attached to a back of the phone pocket.

18. An improved cell phone holder, comprising:
a substantially horizontal phone pocket with an open end;

securing structure for securing the holder to the user's apparel in the vicinity of the waist;

the securing structure being a planar element inside an apparel waist band joined to the phone pocket by a flexible hinge;

the phone pocket having a stiff back, a flexible front, a flexible top and a flexible bottom;

the front of the phone pocket made of lamb leather and the back of the phone pocket, the hinge and the planar element made of water buffalo leather;

the top and upper side of the phone pocket being a first, unitary, continuous piece of elastic textile material, and the bottom and lower side of the phone pocket being a second, unitary, continuous piece of elastic textile material;

the upper and lower sides separated by edges defining an access port;

at least one stabilization corner in the vicinity of a junction of the hinge and planar element;

the stabilization corner formed from a side and portion of a top of the planar element extending horizontally beyond a proximal side of the hinge; and a card pocket on a back surface of the planar element for holding business cards.

\* \* \* \* \*